Sept. 24, 1940.                J. SINKO                    2,215,771
                            CIGAR LIGHTER
                          Filed Nov. 2, 1936
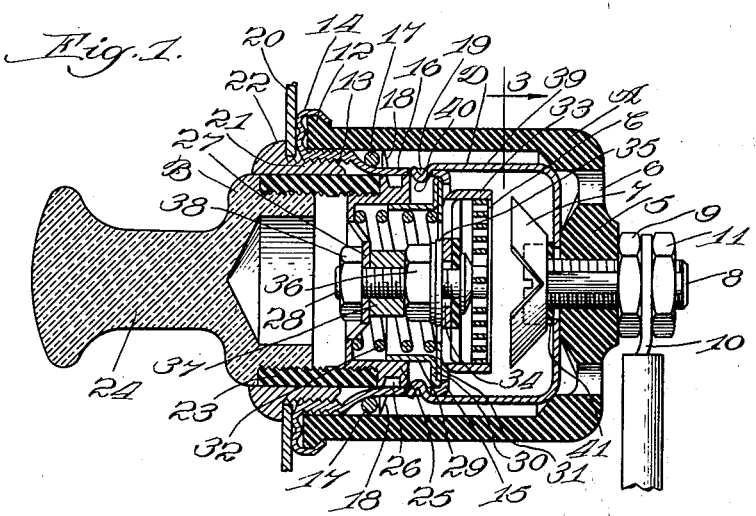

Patented Sept. 24, 1940

2,215,771

UNITED STATES PATENT OFFICE 2,215,771

CIGAR LIGHTER

John Sinko, Chicago, Ill.

Application November 2, 1936, Serial No. 108,842

3 Claims. (Cl. 219—32)

This invention relates to cigar lighters wherein a removable electrical heating element is adapted to be heated to incandescence to be used for lighting cigars or the like.

The primary object of the invention is to provide heat responsive means which will hold the heating element in electrical contact with terminals provided in the socket or holder member until the element is sufficiently heated for use and will then automatically permit the contact to be broken.

Heretofore devices have been patented wherein the igniting unit is twisted or rotated to complete an electrical circuit and thermostatic means have been provided to permit the unit to turn back into open circuit position. However, in the present invention the igniting unit is thrust into the socket member by a straight line movement and no twisting or turning is required to complete the circuit.

One of the advantages of the thermostatic control is in that it protects the heating element from being burned out through over heating. However, if the operator deliberately wishes to superheat the device he may do so by holding the igniting unit in its contacting position forcibly.

The invention is illustrated in the preferred embodiment in the accompanying drawing, in which—

Figure 1 is a longitudinal sectional view of an igniting unit and socket member embodying the invention; Fig. 2 is a sectional view of the socket member with the igniting unit in contacting or energizing position; Fig. 3, a transverse sectional view taken as indicated at line 3 of Fig. 1; and Fig. 4 is a fragmentary sectional view showing a modified form of a thermostat.

In the embodiment illustrated in Figs. 1–3, A designates a socket member; B, an igniting unit provided at its inner end with a heating element C; and D a thermostat for controlling the movement of the igniting unit.

The socket member A may be made of suitable insulating material, if desired, and comprises a cup shaped member having an end-wall 5 provided with ventilating apertures 6. A suitable base-terminal 7 is secured to the end-wall 5 by means of a bolt 8 and nut 9, which in turn is connected with a source of current supply by means of a wire 10 held in position by a nut 11. The open end of the socket member is provided with an outwardly extending shoulder 12. An internally threaded coupler member 13 serves as the other terminal for the igniting unit and is secured to the insulating socket member by means of a flange 14 which extends around and rolls back over the shoulder 12. The coupler extends into the housing A and its front end is provided with a flange 15 which is adapted to be engaged by a portion of the igniting unit to limit the latter's inward travel. If desired, the inner end of the coupler may be slitted to form arms 16 which are urged inwardly into electrical contact with the igniting unit by means of a tension spring 17 which may be held in position by means of outwardly struck detents 18. The arms 16 are shown provided with perforations 19 through which detents of the thermostat may extend into contact with the igniting unit. The socket member may be secured to a perforated panel 20 by means of a bushing 21 having an outwardly extending flange 22. As will be readily understood by reference to Figs. 1 and 2, the bushing may be screwed into the coupler 13.

The igniting unit B is shown with an insulating body member 23 which makes threaded engagement at its outer end with a suitable knob 24. The inner end of the body member makes threaded engagement with a cup shaped member 25 provided with an outwardly open annular groove 26. The hub portion 27 is perforated to receive a stem 28 whose inner end supports one end of the heating element C.

As shown in Fig. 1 a sleeve member 29 is slidably mounted in the member 25 and has an outwardly extending flange 30 which is doubled back, as indicated at 31, to provide a seat for a compression spring 32. The other end of the spring 32 bears against the outer end of the cup member 25 and thereby urges the flange 30 away from the member 25.

The heating element C may be in the form of a coil of suitable resistance tape and has its outer end connected to a cup shaped member 33 while its inner end is secured to the slitted end cap of the bolt 28. The cup member has an enlarged perforation 34 which is impaled by the stem 28 and is clamped between suitable insulating washers 35 by means of a nut 36. Bolt 28 is provided with a spacing washer 37 disposed between the nut 36 and hub 27 so that the assembly is secured in spaced relation by means of a nut 38.

In the embodiment illustrated in Figs. 1–3, the thermostat comprises a U-shaped bimetal member which is perforated and gripped to the inner end-wall of the socket member A by means of the bolt 8. The rearwardly extending arms 39 are provided with detents 40 which are adapted to extend through perforations 19 in the coupler and engage the groove 26. The arms 39 are resilient and may be forced apart by the inward thrust of the igniting unit B sufficiently to allow the detents to snap into the grooves 26. This movement is accomplished against the spring 32 and the thermostat has sufficient strength, when cold, to prevent the spring 32, unaided, from moving the member 25 outwardly.

Thus it will be understood that when the igniting unit is thrust into closed circuit position, as indicated in Fig. 2, the electrical circuit through the heating element C is completed through terminal 7, cup 33, igniting element C, bolt 28, member 25, and coupler member 13 which contacts with the grounded panel 20. As the heating element reaches incandescence, the heat causes the bimetal-arms 39 to move outwardly and thus permits the member 25 carrying the cup 33, to move back away from the terminal 37 under the influence of the spring 32 and the device is then ready for use.

It may be noted that by this arrangement, the detents 40 cooperate with the spring 32, initially, in preventing the circuit from being completed but that after the circuit has been completed forcibly, the detents hold the cup 33 in contact with the terminal 7 until the heating element is sufficiently hot to enable it to light a cigar.

It may be noted that in the preferred form thermostat D is insulated from the terminal 7 by means of an insulating washer 41.

In the modification illustrated in Fig. 4, the arms 42 of the thermostat are in electrical contact with the base-terminal 43 carried by the end-wall 44 of the socket member. A cup shaped member 45 is provided with an outwardly extending bead 46 which is adapted to be engaged by the notches 47 provided in the arms 42. The operation of the device is substantially the same as described above.

The foregoing detailed description has been given for clearness of understanding only, and no unnecessary limitations should be understood therefrom, but the appended claims should be construed as broadly as permissible, in view of the prior art.

I claim:

1. An electric lighter for cigars comprising: a removable igniting unit having an electrical heating element a socket for receiving and holding said igniting unit comprising a cup shaped housing member of insulating material having on its inner end-wall a current supply terminal and having an outwardly extending shoulder at its open end, an internally threaded coupler forming a terminal in said housing member and secured thereto by a flange extending around and rolled back over said shoulder, and a bezel screwing into said coupler to clamp the same against a perforated panel and thermostatic means for holding the electric heating element in electrical contact with said terminals until the element is ready for use.

2. A device as specified in claim 1, in which the coupler is provided at its inner end with an inwardly extending shoulder adapted to engage a yielding slide-ring provided on the igniting unit to limit its inward travel.

3. A device as specified in claim 1, in which the coupler is provided at its inner end with an inwardly extending shoulder adapted to engage a yielding slide-ring provided on the igniting unit to limit its inward travel, and the thermostatic means comprises a bimetal strip having a detent extending through an opening in the wall of said coupler to engage a groove provided in the wall of the igniting unit.

JOHN SINKO.